(12) United States Patent
Jensen et al.

(10) Patent No.: US 9,409,081 B2
(45) Date of Patent: Aug. 9, 2016

(54) METHODS AND SYSTEMS FOR VISUALLY DISTINGUISHING OBJECTS APPEARING IN A MEDIA ASSET

(71) Applicant: United Video Properties, Inc., Santa Clara, CA (US)

(72) Inventors: Paul G. Jensen, Menlo Park, CA (US); Bill Amidei, La Jolla, CA (US)

(73) Assignee: Rovi Guides, Inc., San Carlos, CA (US)

( * ) Notice: Subject to any disclaimer, the term of this patent is extended or adjusted under 35 U.S.C. 154(b) by 326 days.

(21) Appl. No.: 13/678,685

(22) Filed: Nov. 16, 2012

(65) Prior Publication Data

US 2014/0141877 A1    May 22, 2014

(51) Int. Cl.
| A63F 13/00 | (2014.01) |
| H04N 21/44 | (2011.01) |
| H04N 21/475 | (2011.01) |
| H04N 21/41 | (2011.01) |
| H04N 21/431 | (2011.01) |
| H04N 21/4722 | (2011.01) |
| H04N 21/81 | (2011.01) |
| H04N 21/8543 | (2011.01) |

(52) U.S. Cl.
CPC ............ *A63F 13/00* (2013.01); *H04N 21/4126* (2013.01); *H04N 21/4316* (2013.01); *H04N 21/44008* (2013.01); *H04N 21/4722* (2013.01); *H04N 21/8133* (2013.01); *H04N 21/8543* (2013.01)

(58) Field of Classification Search
CPC ........ G06Q 50/01; G06Q 50/34; A63F 13/12; A63F 13/79; A63F 2300/537; A63F 2300/535; A63F 2011/0097; A63F 3/0615; G07F 17/3237; H04N 21/4755; H04N 21/84; H04N 21/25891; G04L 67/306; G06K 9/46; G06K 9/00268; G06K 9/325; G06F 3/0484; G06F 3/04842; G06F 17/2765; G06F 21/554
USPC ................... 345/419, 629, 633; 463/5–9, 42; 725/47, 135; 705/26.1
See application file for complete search history.

(56) References Cited

U.S. PATENT DOCUMENTS

| 5,923,365 | A | 7/1999 | Tamir et al. |
| 7,458,093 | B2 | 11/2008 | Dukes et al. |
| 7,675,520 | B2 | 3/2010 | Gee et al. |
| 8,522,300 | B2 * | 8/2013 | Relyea et al. ............... 725/135 |
| 8,556,694 | B2 * | 10/2013 | Watanabe ...................... 463/7 |
| 8,768,782 | B1 * | 7/2014 | Myslinski ................. 705/26.1 |
| 2008/0009271 | A1 | 1/2008 | True et al. |
| 2008/0102911 | A1 * | 5/2008 | Campbell et al. .............. 463/9 |
| 2009/0082110 | A1 | 3/2009 | Relyea et al. |
| 2009/0111582 | A1 * | 4/2009 | Schuler et al. ................. 463/42 |
| 2011/0013087 | A1 | 1/2011 | House et al. |
| 2012/0009984 | A1 * | 1/2012 | Amaitis ............. G07F 17/3237 463/4 |
| 2013/0083003 | A1 * | 4/2013 | Perez et al. ................... 345/633 |
| 2013/0157737 | A1 * | 6/2013 | Daly ............................. 463/9 |
| 2014/0011573 | A1 * | 1/2014 | Amaitis et al. ............... 463/42 |
| 2014/0325567 | A1 * | 10/2014 | Mangat et al. ................ 725/47 |

* cited by examiner

*Primary Examiner* — Chante Harrison
(74) *Attorney, Agent, or Firm* — Ropes & Gray LLP

(57) ABSTRACT

Methods and systems are described herein for a media application that indicates to a user when members of his or her fantasy sports team appear in sports programming displayed on a user device. In addition, the media application may display additional information (e.g., statistics, commentary, highlights, etc.) that is particular to members of the fantasy sports team of the user.

27 Claims, 9 Drawing Sheets

600

| OBJECT RECOGNITION FILE |
|---|

602    <FRAME_DETAILS>
604        <OBJECT_1>
606           <OBJECT_1_NUMBER>27</<OBJECT_1_NUMBER>
608           <OBJECT_1_TEAM>TIGERS</<OBJECT_1_TEAM>
610           <POSITION> (1,1), (3,1), (1, 3), (3,3)</POSITION>
612        </OBJECT_1>
614        <OBJECT_2>
616           <OBJECT_2_NUMBER>82</<OBJECT_2_NUMBER>
618           <OBJECT_2_TEAM>HAWKS</<OBJECT_2_TEAM>
620           <POSITION> (5,4), (7,4), (5,6), (7,6)</POSITION>
622        </OBJECT_2>
624 </FRAME_DETAILS>

| 702 | John Smith |
| 704 | Jersey Number: 27 |
| 706 | Team: Tigers |
| 708 | Defensive Back |
| 710 | Tackles Today: 5 |
| 712 | Tackles Season: 21 |
| 714 | Sacks Today: 2 |
| 716 | Sacks Today: 8 |
| 718 | Injuries: None |

750

| 752 | User A Fantasy League Roster |
| 754 | John Smith |
| 756 | Jake Brown |
| 758 | Eric Cohn |
| 760 | Ed Sanchez |
| 762 | Peter Allen |
| 764 | Brett Rogers |
| 766 | Ray Micheals |
| 768 | Sam Bradley |

FIG. 7

METHODS AND SYSTEMS FOR VISUALLY DISTINGUISHING OBJECTS APPEARING IN A MEDIA ASSET

BACKGROUND OF THE INVENTION

Fantasy sports are games where users compile "teams" of real-life players and compete against other users based on the statistics generated by the players during real-life sports contests. As fantasy sports have become increasingly popular, users frequently view sports programming in order to assess the play of members on their fantasy team, as opposed to watching whether or not a particular team wins. Therefore, traditional commentary and added features (e.g., statistical analyses displayed on-screen during a game), which normally concern a team as a whole, are of less interest to users viewing sport programming to assess the play of members on their fantasy sports team. Moreover, without commentary or added features addressing particular players, it is often difficult for a user to determine whether or not members of his fantasy team are currently being displayed when viewing sports programming.

SUMMARY OF THE DISCLOSURE

Accordingly, methods and systems are described herein for a media application that indicates to a user when members of his or her fantasy sports team appear in sports programming displayed on a user device. In addition, the media application may display additional information (e.g., statistics, commentary, highlights, etc.) that is particular to members of the fantasy sports team of the user.

In some embodiments, the media application receives sports programming displayed on a first user device and processes the sports programming using an object recognition module to determine a name associated with at least one player currently appearing in the sports programming. For example, the media application may receive sports programming in the form of a video. The video may include a series of frames. For each frame of the video, the media application may use an object recognition module to determine the name of each player currently appearing in the frame.

In some embodiments, the object recognition module may detect characteristics associated with each player in the frame. For example, the object recognition module may determine the jersey number and team name of a player using dynamic character recognition. The media application may then compare the characteristics associated with each player (e.g., the jersey number and team name of a player) to a database listing the names of players with those characteristics. The media application may then compare the name of each player currently being displayed to the names of the members of a fantasy sports team associated with a user. For example, the media application may reference a user profile or a database, which lists the names of all members of the fantasy sports team of the user.

Based on the comparison, the media application may determine whether a member of the fantasy sports team associated with the user corresponds to a player currently appearing in the sports programming displayed on the first user device. If they do correspond, the media application transmits an instruction to visually distinguish the player (e.g., by highlighting the player or otherwise indicating to the user that the player corresponds to a member of the user's fantasy sport team) on the first user device.

In some embodiments, the media application may also transmit an instruction to present additional information associated with the member. For example, while viewing the sports programming, a user may wish to know particular statistics about a member of his or her fantasy sports team. Alternatively or additionally, the user may wish to access commentary, box-scores, replays, and/or user-generated content, any of which may be accessed and/or adjusted based on user inputs. In some embodiments, the additional information may be overlaid on the player in the sports programming that corresponds to the member. In some embodiments, the additional information may be removed by the media application upon determining that the player is no longer currently displayed.

In some embodiments, the additional information may appear on a second user device, while the sports programming appears on the first user device. In some embodiments, the media application may display additional information on the second user device only, in response to user inputs. For example, while viewing sports programming on a first user device (e.g., a laptop computer), the media application may visually distinguish and/or present additional information on a second user device (e.g., a smartphone).

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows an illustrative example of a data structure associated with an object recognition module, which determines the objects and characteristics associated with those objects appearing in sports programming in accordance with some embodiments of the disclosure;

FIG. 7 shows an illustrative example of a data structure associated with the name of a player currently appearing on a display of sports programming and a data structure associated with the names of members of a fantasy sports team associated with a user in accordance with some embodiments of the disclosure;

DETAILED DESCRIPTION OF DRAWINGS

Figure 1A:
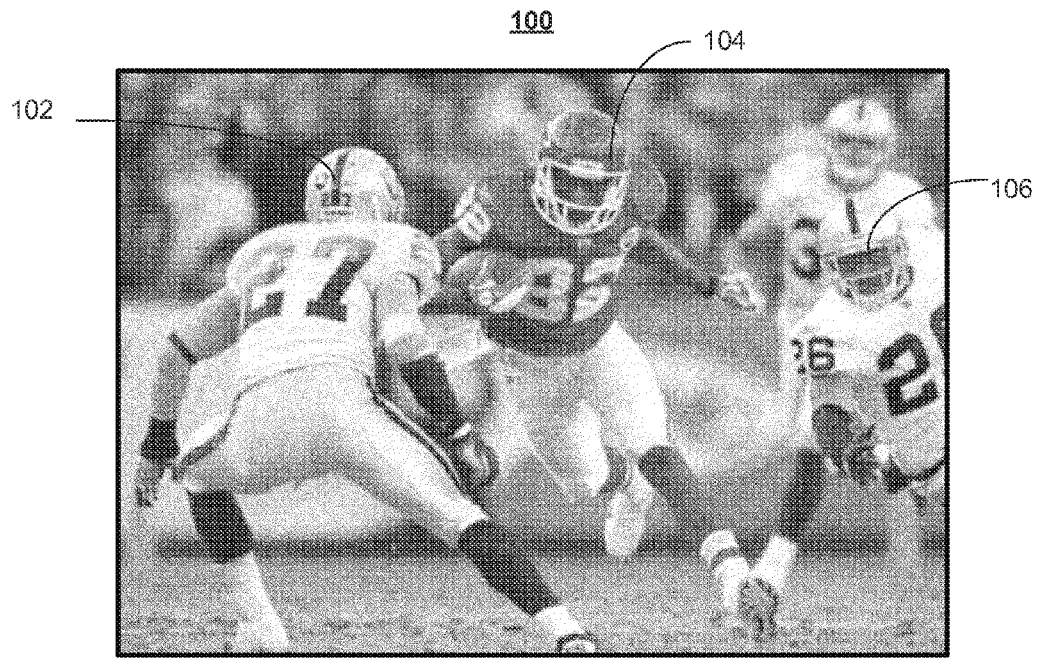
FIG. 1A shows an illustrative example of sports programming that may appear on a user device in accordance with some embodiments of the disclosure.

Methods and systems are described herein for a media application that indicates to a user when players corresponding to members of his or her fantasy sports team appear in sports programming displayed on a user device. In addition, the media application may display additional information (e.g., statistics, commentary, highlights, etc.) that is particular to members of the fantasy sports team of the user on one or more user devices.

As used herein, "sports programming" refers to media assets relating to sporting events or athletic competitions. For example, a media asset featuring the display of a live football game or news regarding a particular football game (e.g., describing/summarizing the game or showing a video re-cap) may be considered sports programming. It should be noted that although some embodiments of this disclosure relate to the use of a media application to visually distinguish players during sports programming, the media application may be used with any type of media asset. For example, in some embodiments, the media application may visually distinguish particular characters during a sitcom or contestants during a game show.

It should also be noted that although some embodiments of this disclosure relate to the use of a media application to visually distinguish players corresponding to members of a fantasy sports team associated with the user, the media application may be used to visually distinguish a player associated with a user in any way. For example, in some embodiments, the media application may access a user profile to determine that a user may be interested in a particular player that is not associated with the fantasy sports team of a user (e.g., a player that is about to set a particular record of interest to the user, or a player that attended the same college as the user). Additionally or alternatively, the media application may determine, based on a user profile, that an actor or character appearing in a media asset (which may not be related to sports programming) is of particular interest to a user, and may, therefore, visually distinguish the actor or character.

As referred to herein, the terms "media asset" and "content" should be understood to mean an electronically consumable user asset, including, but not limited to, sports programming, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front-facing screen and a rear-facing screen, multiple front screens, or multiple angled screens. In some embodiments, the user equipment device may have a front-facing content capture device and/or a rear-facing content capture device. On these user equipment devices, users may be able to navigate among and locate the same content available through a television. Consequently, a media application may be available on these devices as well. The application provided may be for content available only through a television, for content available only through one or more of other types of user equipment devices, or for content available both through a television and one or more of the other types of user equipment devices. The media applications may be provided as on-line applications (i.e., provided on a website), or as stand-alone applications or clients on user equipment devices. Various devices and platforms that may implement media applications are described in more detail below.

As used herein, a "player" refers to any person participating in sports programming. For example, a player may be a person that is televised (e.g., broadcasted, streamed, or otherwise recorded/displayed to a user) during his or her participation in a football game. It should be noted that although some embodiments of the disclosure refer to sports programming displaying a particular sport (e.g., football), the media application may be used with any sport. In addition, it should also be noted that although some embodiments of the disclosure refer to visually distinguishing a player, the media application may be used with any object in a media asset. As used herein, an "object" refers to any entity, item, or feature represented in an image or video for which the media application may process. For example, an object may be a character or actor in a media asset (whether or not the media asset is sports programming). Additionally and/or alternatively, an object could be an item used by a character in a media asset (e.g., an automobile used by a player in a televised car race).

As used herein, "additional information" refers to any information that may be of interest to a user regarding a player or object in a media asset. For example, additional information may include commentary (e.g., is audio or visual), box-scores or other textual description of the events in the media asset, replays of the media asset or other media assets related to the displayed media asset, advertisements (e.g., products and/or promotions used, endorsed, and/or related to the player), alternative program recommendations (e.g., other media assets featuring the player) and/or user-generated content (e.g., micro-blog posts, status updates, or any information presented on, or received from, a social network) created, or received by, the user or a third-party. For example, when displaying a sitcom, the media application may visually distinguish and present additional information about a character (e.g., as an overlay on the sitcom) that users are currently commenting about on a social network. In some embodiments, additional information may be displayed on the display screen of a user device in an overlay, on-screen banner, a scrolling ticker, and/or a picture-in-a-picture display. In some embodiments, the additional information may be updated in real-time (e.g., as updated statistics are received from a remote server).

In some embodiments, the media application receives sports programming displayed on a user device and processes the sports programming using an object recognition module to determine a name associated with at least one player currently appearing in the sports programming. As used herein, an "object recognition module" is any device or application, which may be associated with, incorporated into, or accessed by the media application or the user equipment upon which the media application is implemented and tasked with finding a given object and/or determining characteristics about the object in an image or video.

The object recognition module may use edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the objects and/or characteristics in media assets. For example, the media application may receive sports programming in the form of a video. The video may include a series of frames. For each frame of the video, the media application may use an object recognition module to determine the characteristics associated with each player currently appearing in the sports programming.

In addition, the media application may use multiple types of optical character recognition and/or fuzzy logic, for example, when comparing multiple data fields (e.g., as contained in data structures described below). For example, the particular data field may be a textual data field. Using fuzzy logic, the system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, additional information, and/or any other data required for the function of the embodiments described herein. Furthermore, the data fields could contain values (e.g., the data fields could be expressed in binary or any other suitable code or programming language).

As used herein, a "characteristic" of a player refers to any marking, tag, or other signal used to identify a player, including the position of the player, to people or media systems. For example, characteristics of a player may be physical markings that appear on an actual player as the player participates in a televised sporting event (e.g., a jersey number, team name, a name appearing on the uniform, etc.). In some embodiments, the characteristics may also include tags transmitted with the sports programming (e.g., from content source 416 (FIG. 4)) as metadata, which indicates to the media application particular traits and/or attributes (including, but not limited to, the name of a player and/or the position of the player on currently displayed sports programming). In some embodiments, the characteristics of players currently appearing in sports programming may be transmitted in the form of media data. For example, the characteristics determined by an object recognition module incorporated into a media application may be transmitted to a remote server for processing. Additionally or alternatively, media data describing the characteristics may be transmitted from a remote server to a media application.

As used herein, "visually distinguishing" a player may include any indication in the media asset that alerts a user to the presence of the player in the sports programming. In some embodiments, visually distinguishing a player may include highlighting, boxing, bolding, enlarging, changing the color, or otherwise graphically altering the player as displayed in the sports programming. In addition, multimedia indications may also be used. For example, the media application may use audio tones and/or audio descriptions (e.g., a verbal announcement) to indicate the presence of the player in the sports programming. In some embodiments, the media application may additionally or alternatively visually distinguish players based on user inputs (e.g., instructions to visually distinguish or not visually distinguish the players currently appearing or players that will appear in the sports programming).

Figure 1B:
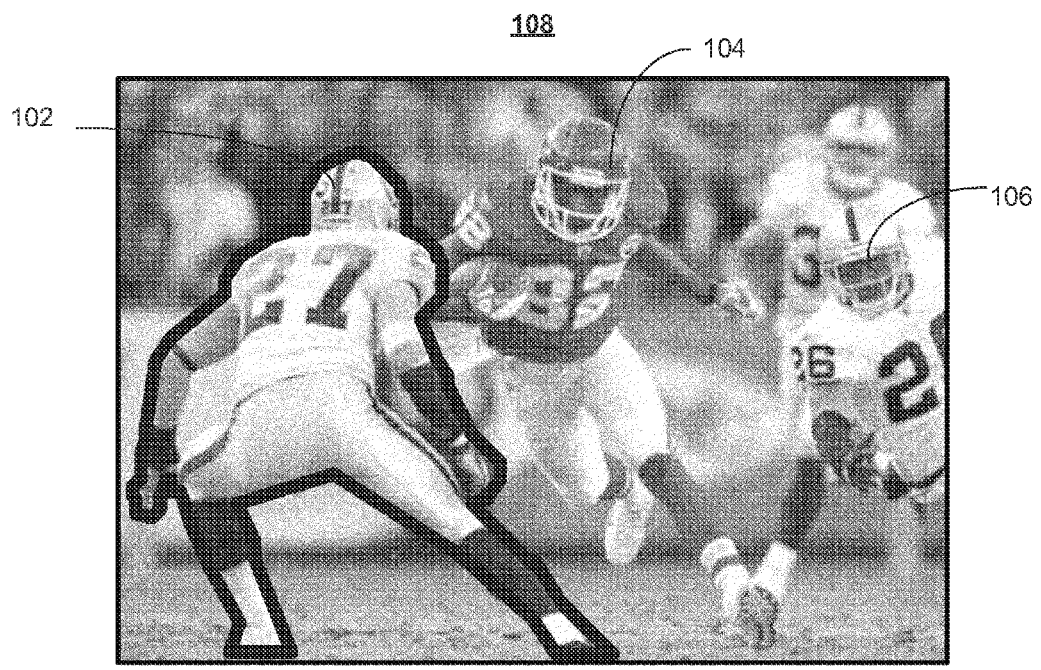
FIG. 1B shows an illustrative example of visually distinguishing a player appearing in the sports programming of FIG. 1A, which corresponds to a member of a fantasy sports team in accordance with some embodiments of the disclosure.
Figure 2:
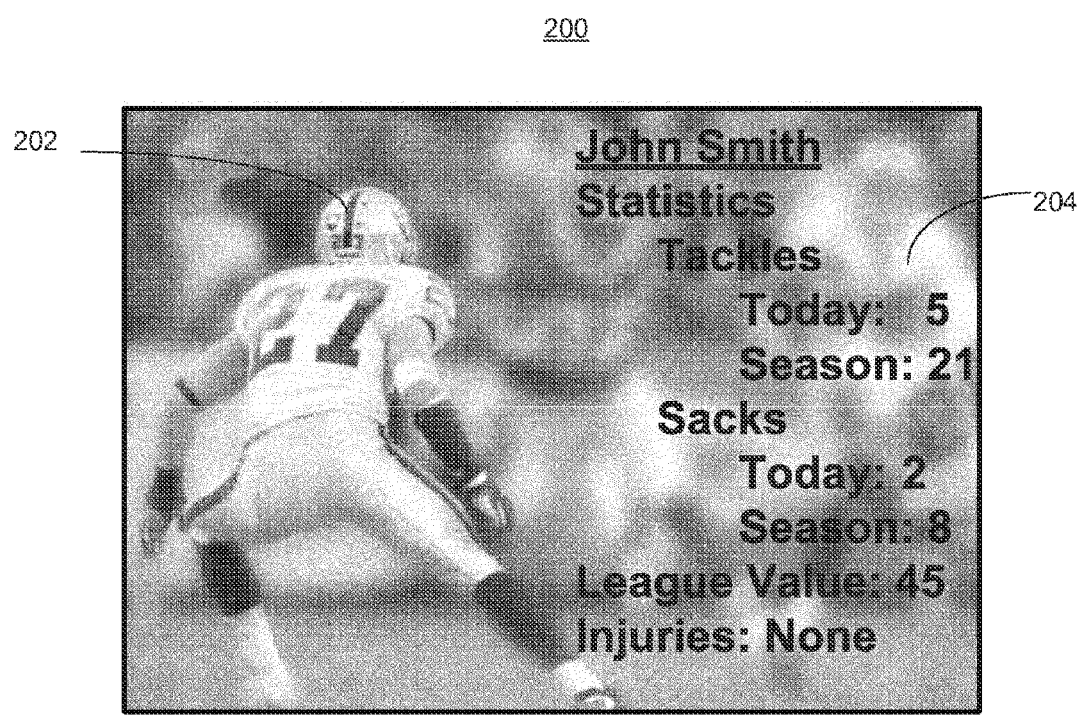
FIG. 2 shows an illustrative example of visually distinguishing a player appearing in the sports programming of FIG. 1A corresponding to a member of a fantasy sports team in addition to overlaying statistics associated with the member of the fantasy sports team on the sports programming of FIG. 1A in accordance with some embodiments of the disclosure.
Figure 4:
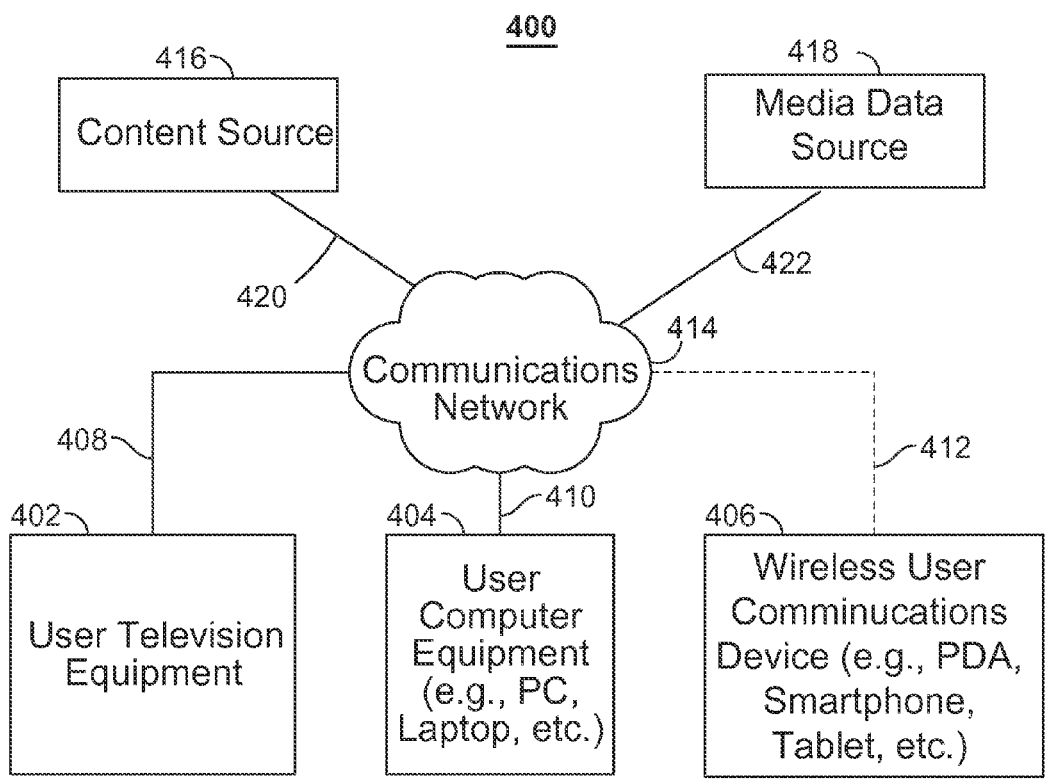
FIG. 4 is a block diagram of an illustrative media system in accordance with some embodiments of the disclosure.
Figure 5A:
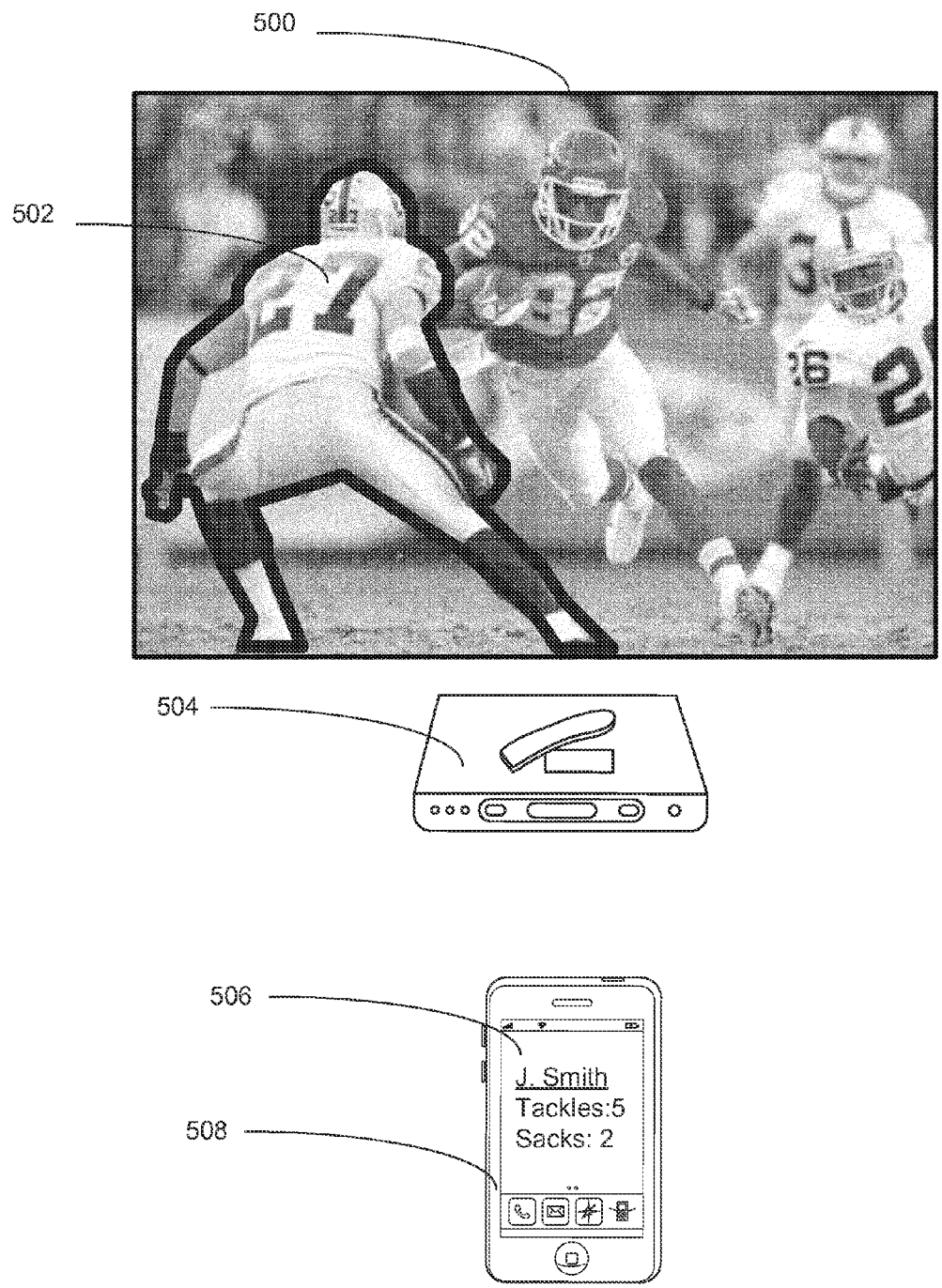
FIG. 5A shows an illustrative example of visually distinguishing a player appearing in the sports programming of FIG. 1A corresponding to a member of a fantasy sports team of FIG. 1A appearing on a first user device in addition to displaying statistics related to the member on a second user device in accordance with some embodiments of the disclosure.

FIG. 1A shows an illustrative example of sports programming that may appear on a user device in accordance with some embodiments of the disclosure. Display 100 may correspond to the displays as shown in FIGS. 1B, 2, and 5A and/or generated as described in FIGS. 8 and 9. It should be noted that display 100 may be presented on any of the devices shown in FIGS. 3-4. For example, in some embodiments, display 100 may be displayed on user equipment 402, 404, and/or 406 (FIG. 4).

FIG. 1A shows display 100, which currently features sports programming. In display 100, three players are currently appearing: player 102, player 104, and player 106. In some embodiments, the media application may use an object recognition module as described above in order to determine the number, characteristics, and position of players, if any, appearing in the sport programming. For example, in some embodiments, display 100 may correspond with step 802 (FIG. 8) and step 902 (FIG. 9).

In some embodiments, by processing the sports programming shown in display 100 (e.g., via process 800 (FIG. 8) and/or process 900 (FIG. 9)), the media application may determine a particular player to visually distinguish.

FIG. 1B shows an illustrative example of visually distinguishing a player appearing in the sports programming of FIG. 1A, which corresponds to a member of a fantasy sports team in accordance with some embodiments of the disclosure. In some embodiments, display 108 may also correspond to the displays as shown in FIGS. 2 and 5A and/or generated as described in FIGS. 8 and 9. It should be noted that display 108 may be presented on any of the devices shown in FIGS. 3-4. For example, in some embodiments, display 108 may be displayed on user equipment 402, 404, and/or 406 (FIG. 4).

In FIG. 1B, display 108 also shows the three players (e.g., player 102, player 104, and player 106) currently appearing in the sports programming in display 100 (FIG. 1A). In FIG. 1B, however, player 102 has been visually distinguished. For example, in FIG. 1B, player 102 is outlined to alert a user to the presence of player 102.

For example, in some embodiments, the media application may have determined (e.g., via process 800 (FIG. 8) and/or process 900 (FIG. 9)) using control circuitry 304 (FIG. 3) that player 102 corresponds to a member of a fantasy sports team associated with the user. For example, in some embodiments, the object recognition module may have detected characteristics associated with each player in the frame. For example, the media application (e.g., using an object recognition module) may determine the characteristics (e.g., jersey number, player name on jersey, and/or team name) of a player 102.

The media application may have generated (e.g., via an object recognition module incorporated into the media application) or received (e.g., via an object recognition module located, for example, at content source 416 (FIG. 4) and/or media data source 418 (FIG. 4)) the characteristics associated with player 102 (and any other players currently appearing in the sports programming) in a data structure (e.g., data structure 600 (FIG. 6)). The media application may then have compared the characteristics associated with each player to data associated with the names of players with those characteristics (e.g., data structure 700 (FIG. 7)) to determine the name of player 102. The media application may then have compared the name of player 102 to the names of the members of a fantasy sports team associated with a user (e.g., as designated by data structure 750 (FIG. 7)). Based on the comparison, the media application may have determined that a member of the fantasy sports team associated with the user and player 102 correspond, and the media application may have transmitted an instruction (e.g., as described in relation to step 814 (FIG. 8) and/or step 914 (FIG. 9)) to visually distinguish player 102 on the user device as shown FIG. 1B.

FIG. 2 shows an illustrative example of visually distinguishing a player appearing in the sports programming of FIG. 1A, which corresponds to a member of a fantasy sports team in addition to overlaying statistics associated with the member of the fantasy sports team on the sports programming of FIG. 1A in accordance with some embodiments of the disclosure. Display 200 may correspond to the displays as shown in FIGS. 1A-B and 5A and/or generated as described in FIGS. 8 and 9. It should be noted that display 200 may be presented on any of the devices shown in FIGS. 3-4. For example, in some embodiments, display 200 may be displayed on user equipment 402, 404, and/or 406 (FIG. 4).

FIG. 2 shows display 200. Display 200 features player 202 and additional information 204. Display 200 may, in some embodiments, correspond to display 100 (FIG. 1A) and/or display 108 (FIG. 1B), and player 202 may, in some embodiments, correspond to player 102 (FIG. 1A-B). Additional information 204 appears as an overlay on the sports programming of display 200 and describes current statistics associated with player 202. In some embodiments, the display of additional information may coincide with the determination that player 202 is of particular interest to a user (e.g., player 202 corresponds to a member of a fantasy sports team associated with the user).

Display 200 also shows an illustrative example of visually distinguishing a player. For example, in display 200, the media application may blur, shade and/or de-emphasize the other players and objects in the sports programming in order for player 202 to gain the attention of the user.

The media application may display additional information 204 according to particular setting (e.g., as determined by a user profile). For example, the data contained in additional information 204 may represent all, or part of, the data associated with player 202 (e.g., data structure 700 (FIG. 7)). The media application may determine the particular data to display based on active user inputs (e.g., the selection of information via user input interface 310 (FIG. 3)) or passive user inputs (e.g., settings in a user profile based on the viewing history of the user).

Figure 3:
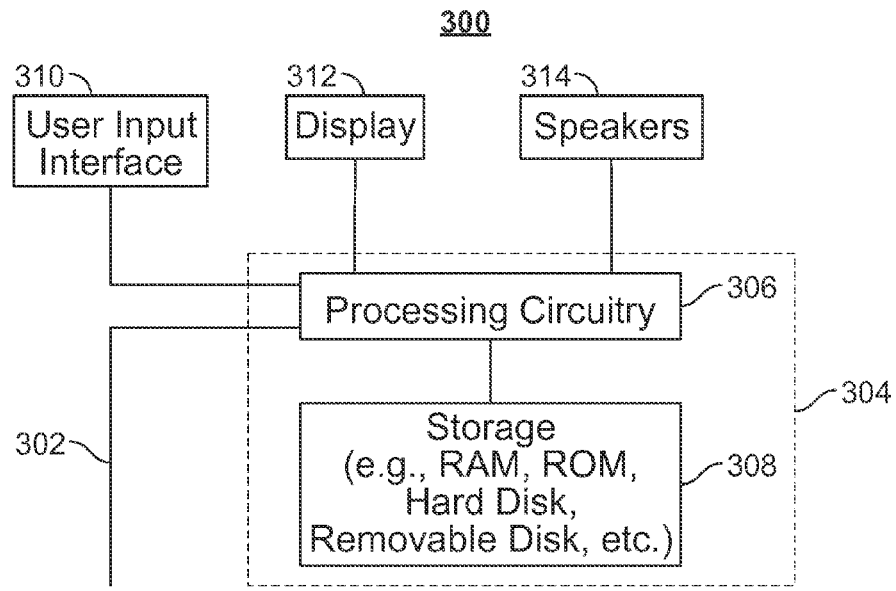
FIG. 3 is a block diagram of an illustrative user equipment device in accordance with some embodiments of the disclosure.

FIG. 3 is a block diagram of an illustrative user equipment device in accordance with some embodiments of the disclosure. It should be noted that the components shown in FIG. 3 may be used to store, receive, transmit, and/or display the sports programming as shown in FIGS. 1A-B, 2, and 5A and/or described in relation to FIGS. 8 and 9. For example, display 100 (FIG. 1) may be displayed on display 312 as instructed by the media application.

Users may access media assets and the media application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate display 100 and 108 (FIG. 1). In some implementations, any action performed by control circuitry 304 may be based on instructions received from the media application and/or media data.

In client-server based embodiments, control circuitry 304 may include communications circuitry suitable for communicating with a media application server or other networks or servers. The instructions for carrying out the above-mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media information, described above, and media application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, including, but not limited to, H.264 and HEVC video compression standards, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive media data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server based application. Data for use by a thick or thin client implemented on user equipment device 300 is retrieved on-demand by issuing requests to a server remote to the user equipment device 300. In one example of a client-server based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a stand-alone device or may be part of a network of devices. Various network configurations of devices may be implemented and are discussed in more detail below.

FIG. 4 is a block diagram of an illustrative media system in accordance with some embodiments of the disclosure. It should be noted that the devices shown in FIG. 4 may be used to store, receive, transmit, and/or display the sports programming as shown in FIGS. 1A-B, 2, and 5A and/or described in relation to FIGS. 8 and 9. For example, display 500 (FIG. 5A) may be displayed on user equipment 402, 404, and/or 406

(FIG. 4) as instructed by the media application. A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and displaying preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable media settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the media experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that, in the exemplary embodiment shown in FIG. 4, it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media data source 418 coupled to communications network 414 via communication paths 420 and 422, respectively. Paths 420 and 422 may include any of the communication paths described above in connection with paths 408, 410, and 412. Communications with the content source 416 and media data source 418 may be exchanged over one or more communications paths, but are shown as a single path in FIG. 4 to avoid overcomplicating the drawing. In addition, there may be more than one of each of content source 416 and media data source 418, but only one of each is shown in FIG. 4 to avoid overcomplicating the drawing. (The different types of each of these sources are discussed below). If desired, content source 416 and media data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media data source 418 may provide media data, such as the media data described above. Media application data may be provided to the user equipment devices using any suitable approach. In some embodiments, the media application may be a stand-alone interactive television program guide that receives program guide data via a data feed (e.g., a continuous feed or trickle feed). Program schedule data and other media data may be provided to the user equipment on a television channel sideband, using an in-band digital signal, using an out-of-band digital signal, or by any other suitable data transmission technique. Program schedule data and other media data may be provided to user equipment on multiple analog or digital television channels.

In some embodiments, media data from media data source 418 may be provided to users' equipment using a client-server approach. For example, a user equipment device may pull media data from a server, or a server may push media data to a user equipment device. In some embodiments, a media application client residing on the user's equipment may initiate sessions with source 418 to obtain media data when needed, e.g., when the media data is out of date or when the user equipment device receives a request from the user to receive data. Media data may be provided to the user equipment with any suitable frequency (e.g., continuously, daily, a user-specified period of time, a system-specified period of time, in response to a request from user equipment, etc.). Media data source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media applications may be implemented partially as a client application on control circuitry 304 of user equipment device 300 and partially on a remote server as a server application (e.g., media data source 418) running on control circuitry of the remote server. When executed by control circuitry of the remote server (such as media data source 418), the media application may instruct the control circuitry to generate the media application displays and transmit the generated displays to the user equipment devices. The server application may instruct the control circuitry of the media data source 418 to transmit data for storage on the user equipment. The client application may instruct control circuitry of the receiving user equipment to generate the media application displays.

Content and/or media data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media data described above. In addition to content and/or media data, providers of OTT content can distribute media applications (e.g., web-based applications or cloud-based applications), or the content can be displayed by media applications stored on the user equipment device.

Media system 400 is intended to illustrate a number of approaches, or network configurations, by which user equipment devices and sources of content and media data may communicate with each other for the purpose of accessing content and providing media data. The embodiments described herein may be applied in any one or a subset of these approaches, or in a system employing other approaches for delivering content and providing media data. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media data. For example, some users may have home networks that are accessed by in-home and mobile devices. Users may control in-home devices via a media application implemented on a remote device. For example, users may access an online media application on a website via a personal computer at their office, or a mobile device such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5A shows an illustrative example of visually distinguishing a player appearing in the sports programming of FIG. 1A corresponding to a member of a fantasy sports team of FIG. 1A appearing on a first user device in addition to displaying statistics related to the member on a second user device in accordance with some embodiments of the disclosure. Displays 500 and 506 may correspond to the displays as shown in FIGS. 1A-B and 2 and/or generated as described in FIGS. 8 and 9. It should be noted that displays 500 and 506 may be presented on any of the devices shown in FIGS. 3-4. For example, in some embodiments, user device 504 and mobile device 508 may correspond to user equipment 402, 404, and/or 406 (FIG. 4).

Display 500 shows sports programming with player 502 currently visually distinguished. In some embodiments, player 502 may have been visually distinguished based on one of more steps from process 800 (FIG. 8) and/or process 900 (FIG. 9). Display 500 is currently displayed on user device 504 (e.g., user equipment 402, 404, and/or 406 (FIG. 4)). In FIG. 5A, additional information (e.g., additional information 204 (FIG. 2)) is currently displayed on mobile device 508.

In some embodiments, the additional information displayed in display 506 on mobile device 508 may be determined according to user inputs received by the media application. The user inputs may be received by the media application from an interface (e.g., user input interface 310 (FIG. 3)) located on user device 504, mobile device 508, and/or any other device. For example, a user may enter selections requesting particular additional information, or modification to currently displayed additional information, about the player (e.g., player 502) that is currently visually distinguished or any other player whether or not the player is currently appearing in the sports programming. For example, in some embodiments, the media application may receive a user input on mobile device 508 and transmit (e.g., via control circuitry 304 (FIG. 3) another instruction to visually distinguish a different player currently appearing in the sports programming on user device 504.

In some embodiments, the media application may determine the additional information and/or the amount of additional information to display on a second user device based on the type of user device. For example, the media application may determine that the second user device (e.g., mobile device 508) has a smaller screen or reduced processing power or bandwidth restrictions. Therefore, the media application may restrict the amount of additional information (e.g., in order to accommodate a smaller screen size) or restrict the display of high-definition or video formats (e.g., in order to accommodate reduced processing power or bandwidth restrictions).

In some embodiments, a user (e.g., via a user input) may instruct the media application as to where the user wishes to display the additional information. For example, in response to a user input, the media application may display the additional information on one or more devices, or may display particular kinds of additional information on one device and different kinds of additional information on another device.

Figure 5B:
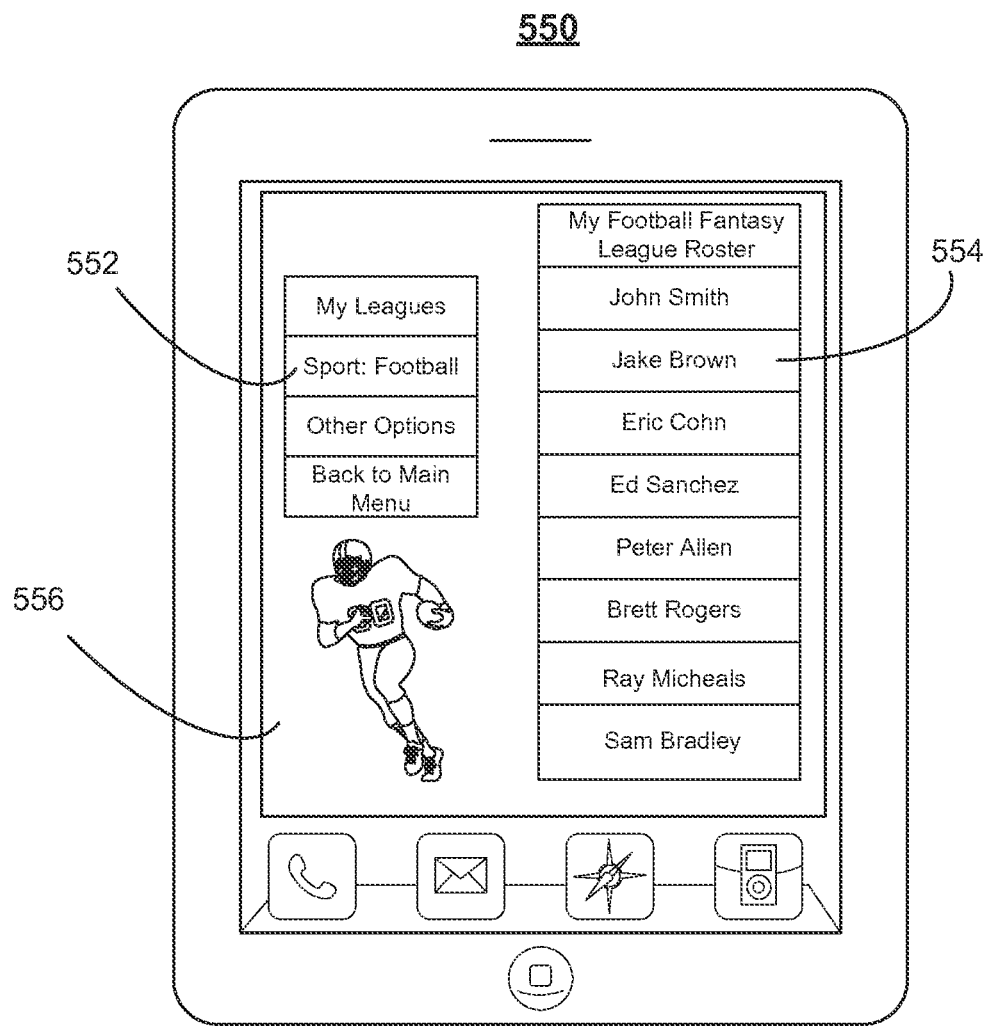
FIG. 5B shows an illustrative example of a user interface display, which may be used to adjust select and/or edit the members of a fantasy sports team associated with a user in accordance with some embodiments of the disclosure.

FIG. 5B shows an illustrative example of a user interface display, which may be used to adjust select and/or edit the members of a fantasy sports team associated with a user in accordance with some embodiments of the disclosure. User device 550, which in some embodiments may correspond to user equipment 402, 404, and/or 406 (FIG. 4), may include user interface display 556. User interface display 556 may be used by a user to create, select, monitor, and/or edit his or her fantasy sports team. In addition, user device 550 may constitute a second screen device as described above (e.g., in relation to user device 508).

On user device 550, a user is currently accessing user interface 556. User interface 556 includes user interface options 552. User interface options 552 allows a user to manage and view his or her fantasy sports leagues. In addition, user interface 556 may be used to customize additional information (e.g., additional information 204 (FIG. 2)), if any, displayed (e.g., on display 200 (FIG. 2)) on a user device.

In some embodiments, user interface 556 may be used to visually distinguish other objects in media assets (including non-sports programming media assets). For example, by selecting one or more of user interface options 552, a user may be able to instruct the media application to visually distinguish any of the objects (e.g., a particular actor or other objects that may interest a user as determined by a user profile).

User interface 556 may also be used to view the members of a fantasy sports team associated with a user. For example, roster 554 displays the names of the members of a fantasy sports team associated with the user. In some embodiments, roster 554 may corresponded to data structure 750 (FIG. 7) discussed below. For example, the media application may compare the names on roster 554 to the names of players determined to be currently appearing in sports programming as discussed in relation to process 800 (FIG. 8) and process 900 (FIG. 9) below.

In some embodiments, edits to roster 554 may affect the player or players that are visually distinguished by the media application. For example, the media application may user roster 554 (or a data structure corresponding to roster 554) to determine whether or not to visually distinguish a player (e.g., as discuss below in relation to FIG. 7). The addition or removal of a name from roster 554 may cause and/or prevent the media application to/from visually distinguishing a player.

It should be noted that the interface, options, and information shown and described in FIG. 5B is illustrative only and should not be taken to be limiting. Alternative or additional information may be added or removed in some embodiments.

FIG. 6 shows an illustrative example of a data structure associated with an object recognition module, which determines the objects and characteristics associated with those objects appearing in sports programming in accordance with some embodiments of the disclosure. Data structure 600 may be used to provide the displays as shown in FIGS. 1A-B, 2, and 5A and/or described in relation to FIGS. 8 and 9. It should be noted that data structure 600 or any data therein, could be stored, generated, transmitted, and/or received by any of the devices shown in FIGS. 3-4. For example, data structure 600 may be processed by control circuitry 304 (FIG. 3) as instructed by the media application.

In some embodiments, the media application may generate data structure 600. For example, using an object recognition module, the media application may determine the characteristics of each player currently appearing in the sports programming. In some embodiments, data structure 600 may be transmitted to the media application (e.g., from content source 416 (FIG. 4), media data source 418 (FIG. 4), and/or any device accessible via communications network 414 (FIG. 4)). For example, in some embodiments, the object recognition module may be located on a remote server (e.g., media data source 418 (FIG. 4)). The sports programming may, therefore, be processed at the remote server and the characteristics of each player may be transmitted as media data (e.g., metadata) to the media application. In another example, data structure 600 may be provided by the content source. For example, the content source may generate data structure 600 while recording the sporting event associated with the sports programming. Data structure 600 may then be transmitted to the media application and stored on local memory (e.g., storage 308 (FIG. 3) of user equipment 402, 404, and/or 406 (FIG. 4)).

Data structure 600 includes multiple lines of code. It should be noted that the data (e.g., represented by the various lines of code) displayed in data structure 600 is not limiting, and in some embodiments, the data as described in data structure 600 may be replaced or supplemented by other data as discussed in the disclosure. Lines 602 through 624 indicate to the media application that data structure 600 relates to a frame of the sports programming. For example, the media application may, using the object recognition module, process each frame of the sports programming as it is received.

Lines 604 through 612 indicate to the media application the characteristics such as the jersey number (e.g., line 606), the team name (e.g., line 608), and the position (e.g., line 610) of an object (e.g., player 102 (FIG. 1B)) in the sports programming. In some embodiments, the position of an object may be described by the upper-left, upper-right, lower-left, and lower-right coordinates. Lines 614 through 622 indicate to the media application the characteristics such as the jersey number (e.g., line 616), the team name (e.g., line 618), and the position (e.g., line 620) of another object (e.g., player 104 (FIG. 1B)) in the sports programming.

In some embodiments, the media application may use this information to determine whether or not the players currently displayed in the sports programming correspond to members of a fantasy sports team associated with the user (e.g., as described in FIGS. 8 and 9 below). For example, the media application may compare the data in data structure 600 to data in data structure 700 (FIG. 7) and data structure 750 (FIG. 7) described below.

FIG. 7 shows an illustrative example of a data structure associated with the name of a player currently appearing on a display of sports programming and a data structure associated with the names of members of a fantasy sports team associated with a user in accordance with some embodiments of the disclosure. Data structure 700 and 750 may be used to provide the displays as shown in FIGS. 1A-B, 2, and 5A and/or described in relation to FIGS. 8 and 9. It should be noted that data structures 700 and 750 or any step thereof, could be stored, generated, transmitted, and/or received by any of the devices shown in FIGS. 3-4. For example, data structures 700 and 750 may be processed by control circuitry 304 (FIG. 3) as instructed by the media application. In some embodiments, data structures 700 and 750 may be contained on the same database or on different databases (e.g., a database(s) located at content source 416, media data source 418 (FIG. 4), user equipment 402, 404, and/or 406 (FIG. 4), and/or any location accessible via communications network 414 (FIG. 4)). Additionally or alternatively, data structure 700 and data structure 750 may, in some embodiments, be combined in a single data structure.

Data structure 700 includes numerous data fields (e.g., data fields 702 through 718). In some embodiments, the data of data structure 700 may be generated at a remote server. For example, data structure 700 may be compiled from numerous sources and represent the current statistics (e.g., number of tackles) and known characteristics (e.g., jersey number, team name, etc.) for a particular player.

In some embodiments, the media application uses data structure 700 to determine the names of players currently being displayed in sports programming. For example, in some embodiments, the media application may generate data structure 600 (FIG. 6) and compare the data in data structure 600 (FIG. 6) (e.g., the jersey number of a player currently appearing in the sports programming) to data structure 700 (FIG. 7) to determine a name associated with the player (e.g., as described in relation to FIG. 9 below).

For example, upon determining that data structure 600 (FIG. 6) indicates that a player (e.g., player 102 (FIG. 1A)) has a jersey number of "27" (e.g., line 606 (FIG. 6)) and plays for a particular team "Tigers" (e.g., 608 (FIG. 6)), the media application may search a database containing a data structure associated with all players for data fields corresponding to a jersey number of "27" and a team name of "Tigers." Upon locating a data structure (e.g., data structure 700 (FIG. 7)) with data fields (e.g., data field 706 and data field 708) corresponding to the values indicated by data structure 600 (FIG. 6), the media application may determine the name of the player (e.g., via processing data field 702) associated with located data structure (e.g., data structure 700).

In some embodiments, the data in data structure 700 may also be used to generate additional information (e.g., additional information 204 (FIG. 2)) about a player. For example, data fields 708 through 718 describe current statistics and other information about the player associated with data structure 700. Upon determining to visually distinguish a player (e.g., as described in step 814 (FIG. 8)), the media application may also retrieve information from data structure 700 to overlay on the sports programming (e.g., as shown and described in FIG. 2).

Data structure 750 includes the names of players currently on the fantasy sports team associated with "User A" as shown by data field 752. In some embodiments, upon determining the name of a player currently appearing in the sports programming (e.g., by comparing data structure 600 (FIG. 6) to data structure 700 (FIG. 7) as described above), the media application may compare the name of the player (e.g., data field 702) to the names of members (e.g., as shown by data fields 754 through 768).

Figure 8:
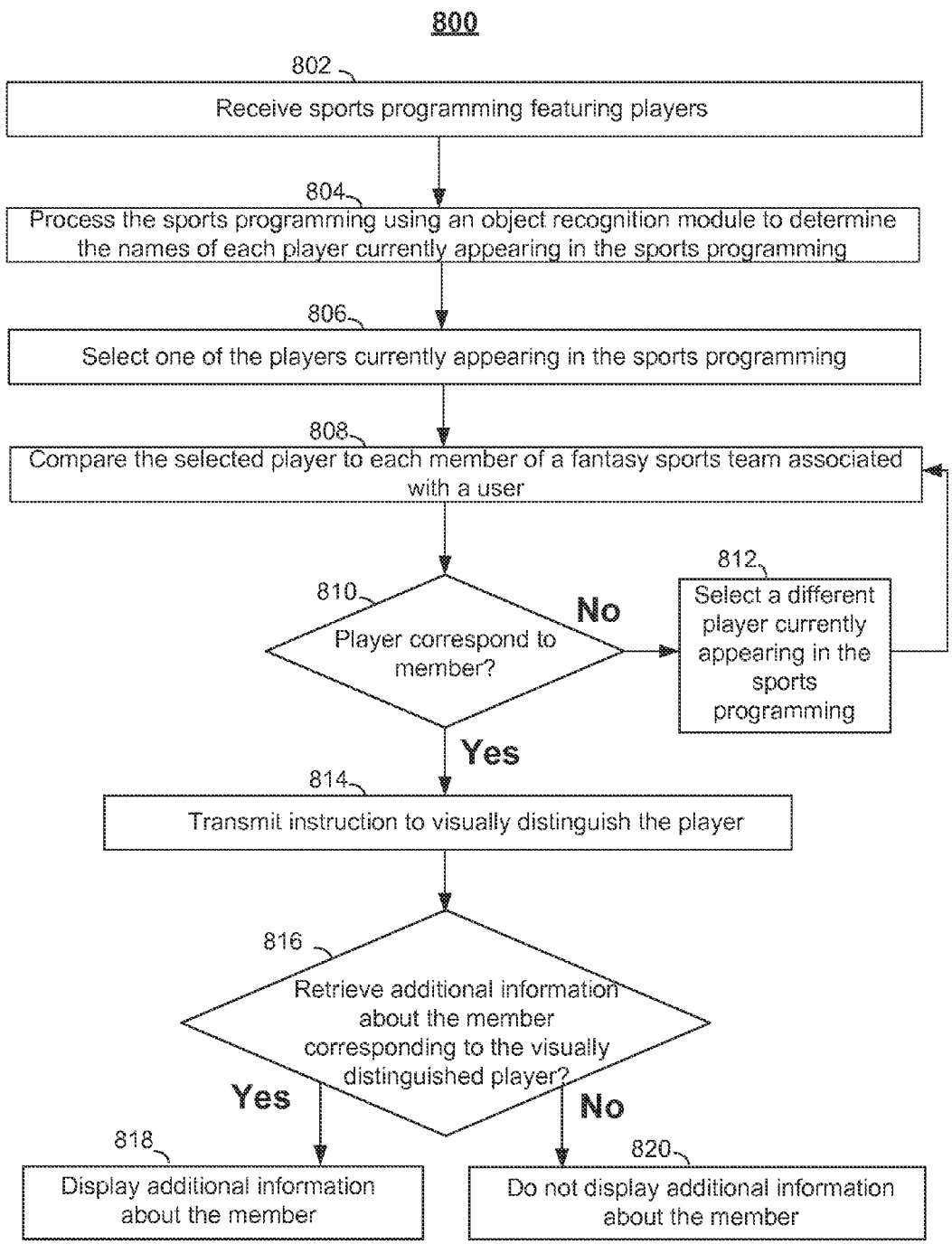
FIG. 8 is a flowchart of illustrative steps for selecting a player to visually distinguish and determine whether or not to display additional information about the player in accordance with some embodiments of the disclosure.
Figure 9:
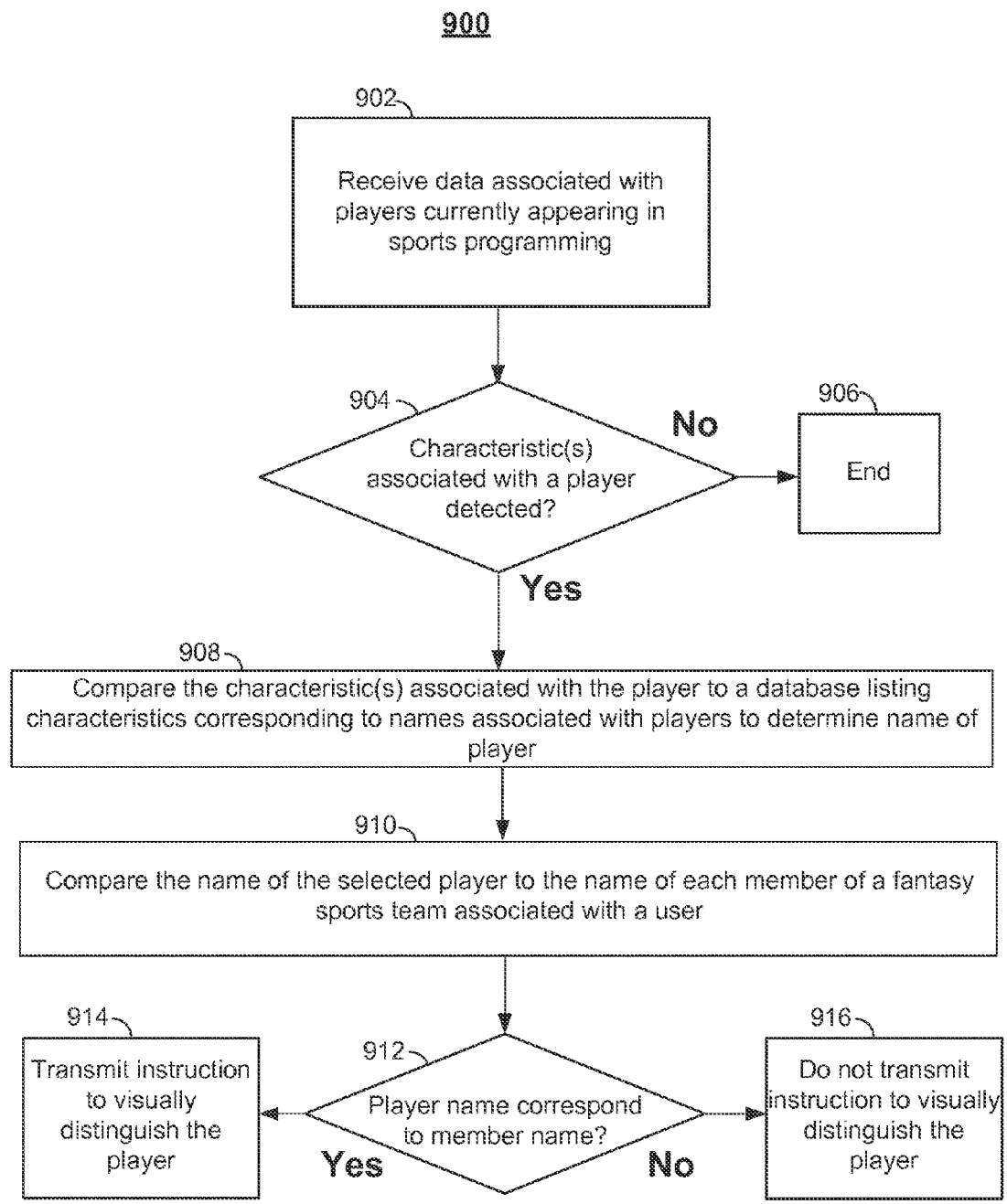
FIG. 9 is a flowchart of illustrative steps for using the characteristics associated with a player currently appearing in sports programming to determine whether or not to visually distinguish the player in accordance with some embodiments of the disclosure.

Upon determining that one of the names of the members of the fantasy sports team associated with the user (e.g., data structure 750) corresponds with the name of the player, the media application may transmit an instruction to visually distinguish the player as described in step 814 (FIG. 8). For example, based on a comparison of data structure 600 (FIG. 6) and data structure 700 (FIG. 7), the media application may determine the name of the player is "John Smith" as indicated by data field 702. The media application may then compare the name "John Smith" to each name in data structure 750. Data field 754 also includes the name "John Smith"; therefore, the media application may determine that these two names correspond. In response, the media application may transmit an instruction (e.g., via control circuitry 304 (FIG. 3)) to visually distinguish the player.

It should be noted that the data (e.g., represented by the various data fields) displayed in data structure 700 and data structure 750 is not limiting, and in some embodiments, the data as described in data structure 700 and data structure 750 may be replaced or supplemented by other data as discussed in the disclosure.

FIG. 8 is a flowchart of illustrative steps for selecting a player to visually distinguish and determine whether or not to display additional information about the player in accordance with some embodiments of the disclosure. Process 800 may be used to provide the displays as shown in FIGS. 1A-B, 2, and 5A and/or generate/transmit the data structures as shown in FIGS. 6 and 7. It should be noted that process 800 or any step thereof, could be displayed on, or provided by, any of the devices shown in FIGS. 3-4. For example, process 800 may be executed by control circuitry 304 (FIG. 3) as instructed by the media application.

At step 802, the media application receives sports programming featuring players. For example, the media application, implemented on a user device (e.g., user equipment 402, 404, and/or 406 (FIG. 4), may receive sports programming from content source 416 (FIG. 4). At step 804, the media application may process the sports programming using an object recognition module to determine the names of each player currently appearing in the sports programming. For example, the object recognition module (e.g., incorporated in or accessible by the media application) may generate a data structure (e.g., data structure 600 (FIG. 6)) describing the players in the sports programming.

At step 806, the media application selects one of the players currently appearing in the sports programming. For example, the media application may identify several players currently appearing in the sports programming (e.g., player 102, player 104, and player 106 (FIG. 1B)), and the media application may select one of the players (e.g., player 102 (FIG. 1B)).

At step 808, the media application compares the selected player to each member of a fantasy sports team associated with a user. For example, the media application may use an object recognition module to determine the players currently appearing in the sports programming, for example, as described in relation to FIG. 9 below. The media application may then compare the selected player to a list (e.g., data structure 750 (FIG. 7)) of members of a fantasy sports team associated with a user.

At step 810, the media application determines whether or not the selected player corresponds to any one of the members of a fantasy sports team associated with a user. If the media application determines that the selected player does not correspond to any one of the members of a fantasy sports team associated with the user, the media application proceeds to step 812 and selects a different player currently appearing in the sports programming. After selecting a different player currently appearing in the sports programming, the media application returns to step 808. In some embodiments, the media application may terminate process 800 upon determining that none of the players currently appearing in the sports programming corresponds to any one of the members of a fantasy sports team associated with a user.

If the media application determines that the selected player corresponds to one of the members of a fantasy sports team associated with the user, the media application proceeds to step 814 and transmits an instruction (e.g., via control circuitry 304 (FIG. 3)) to visually distinguish the player (e.g., as shown and described in relation to player 102 (FIG. 1B).

At step 816, the media application determines whether or not to retrieve additional information about the member corresponding to the visually distinguished player. For example, in some embodiments, the media application may overlay additional information (e.g., as shown and described in relation to FIG. 2) on the display (e.g., display 312 (FIG. 3)) of the user device (e.g., user equipment 402, 404, and/or 406 (FIG. 4)). In some embodiments, the media application may automatically display additional information associated with the visually distinguished player. Additionally or alternatively, the media application may display, adjust, or access different additional information in response to receiving a user input (e.g., via user input interface 310 (FIG. 3)).

If the media application determines to retrieve additional information (e.g., additional information found in data structure 750 (FIG. 7)), the media application displays additional information about the member at step 818. For example, the media application may transmit an instruction (e.g., via control circuitry 304 (FIG. 3)) to display (e.g., on display 312 (FIG. 3)) on a user device (e.g., user equipment 402, 404, and/or 406 (FIG. 4)). If the media application determines not to retrieve additional information, the media application does not display additional information associated with the member at step 820. In some embodiments, the media application may remove the additional information upon receiving a user input or detecting that the player corresponding to the member is no longer displayed on screen (e.g., the player has moved off-screen).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

FIG. 9 is a flowchart of illustrative steps for using the characteristics associated with a player currently appearing in sports programming to determine whether or not to visually distinguish the player in accordance with some embodiments of the disclosure. Process 900 may be used to provide the displays as shown in FIGS. 1A-B, 2, and 5A and/or generate/transmit the data structures as shown in FIGS. 6 and 7. It should be noted that process 900 or any step thereof, could be displayed on, or provided by, any of the devices shown in FIGS. 3-4. For example, process 900 may be executed by control circuitry 304 (FIG. 3) as instructed by the media application.

At step 902, the media application, implemented on user equipment 402, 404, and/or 406 (FIG. 4) receives data associated with players currently appearing in sports programming. For example, the media application may receive data structure 600 (FIG. 6) from the object recognition module.

At step 904, the media application determines whether or not characteristics associated with a player are detected. For example, the data structure (e.g., data structure 600 (FIG. 6)) received from the object recognition module may not include any characteristics associated with players currently appearing. (e.g., no players may be currently displayed or the sports programming may currently be in a commercial break). If no characteristics are detected, the media application may terminate process 900 at step 906.

If characteristics associated with a player are detected, the media application may continue to step 908 and compare the characteristic(s) associated with the player to a database listing characteristics corresponding to names associated with players. For example, the media application may compare the data in data structure 600 (FIG. 6) to the data in data structure 700 (FIG. 7) as described in relation to FIG. 7 above in order to determine the name of the player.

At step 910, the media application compares the name of the selected player to the name of each member of a fantasy sports team associated with a user to determine whether the selected player corresponds to a member of the fantasy sports team. For example, the media application may compare the name determined at step 908 to data structure 750 (FIG. 5A), which lists the names of members on the fantasy sports team associated with the user.

At step 912, the media application determines whether the name determined in step 908 corresponds to a name in data structure 750 (FIG. 7). If the media application determines that the name of the selected player and the names in data structure 750 (FIG. 7) correspond, the media application transmits an instruction to visually distinguish the player at step 914. If the media application determines that the name of the selected player and the names in data structure 750 (FIG. 7) do not correspond, the media application does not transmit an instruction to visually distinguish the player at step 916.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for visually distinguishing players appearing in media assets, the method comprising:
    receiving, using a touchscreen input interface of a second device, a user input to visually distinguish a member of a fantasy sports team associated with a user;
    in response to receiving the touchscreen input on the second device:
    receiving sports programming displayed on a first user device;
    processing the sports programming using an object recognition module to determine a name associated with a player currently appearing in the sports programming displayed on the first user device;
    comparing the name associated with the player to a name associated with the member;
    based on the comparison, determining whether the member corresponds to the player; and
    in response to determining that the member corresponds to the player, transmitting an instruction to visually distinguish the player on the first device.

2. The method of claim 1, further comprising in response to determining that the member corresponds to the player, transmitting a second instruction to present additional information associated with the member.

3. The method of claim 2, further comprising overlaying the additional information on the player in the sports programming displayed on the first user device.

4. The method of claim 2, further comprising removing the additional information associated with the member in response to determining that the player is no longer currently appearing in the sports programming displayed on the first user device.

5. The method of claim 2, wherein additional information consists of audio commentary, box-scores, replays, statistics, and user-generated content.

6. The method of claim 2, wherein the additional information is presented on the second user device.

7. The method of claim 1, further comprising transmitting instructions to modify the additional information in response to a user input.

8. The method of claim 1, wherein processing the received data using an object recognition module to determine the name associated with the player further comprises:
   detecting, using the object recognition module, characteristics associated with the player; and
   comparing the characteristics associated with the player to a database listing characteristics corresponding to names associated with players.

9. The method of claim 8, wherein characteristics associated with the player comprise a jersey number.

10. A system for visually distinguishing players appearing in media assets, the system comprising a second device having:
    a touchscreen input interface configured to receive a user input to visually distinguish a member of a fantasy sports team associated with a user; and
    control circuitry configured, in response to receiving the touchscreen input on the second device to:
       receive sports programming displayed on a first user device;
       process the sports programming using an object recognition module to determine a name associated with a player currently appearing in the sports programming displayed on the first user device;
       compare the name associated with the player to a name associated with the member;
       based on the comparison, determine whether the member corresponds to the player; and
       in response to determining that the member corresponds to the player, transmit an instruction to visually distinguish the player.

11. The system of claim 10, wherein the control circuitry is further configured to transmit a second instruction to present additional information associated with the member in response to determining that the member corresponds to the player.

12. The system of claim 11, wherein the control circuitry is further configured to overlay the additional information on the player in the sports programming displayed on the first user device.

13. The system of claim 11, wherein the control circuitry is further configured to remove the additional information associated with the member in response to determining that the player is no longer currently appearing in the sports programming displayed on the first user device.

14. The system of claim 11, wherein additional information consists of audio commentary, box-scores, replays, statistics, and user-generated content.

15. The system of claim 11, wherein the additional information is presented on the second user device.

16. The system of claim 10, wherein the control circuitry is further configured to transmit instructions to modify the additional information in response to a user input.

17. The system of claim 10, wherein processing the received data using an object recognition module to determine the name associated with the player further comprises:
    detecting, using the object recognition module, characteristics associated with the player; and
    comparing the characteristics associated with the player to a database listing characteristics corresponding to names associated with players.

18. The system of claim 17, wherein characteristics associated with the player comprise a jersey number.

19. A system for visually distinguishing players appearing in media assets, the system comprising:
    means for receiving, using a touchscreen input interface of a second device, a user input to visually distinguish a member of a fantasy sports team associated with a user;
    in response to receiving the touchscreen input on the second device:
    means for receiving sports programming displayed on a first user device;
    means for processing the sports programming using an object recognition module to determine a name associated with a player currently appearing in the sports programming displayed on the first user device;
    means for comparing the name associated with the player to a name associated with a member of the fantasy sports team associated with the user;
    means for, based on the comparison, determining whether the member associated with the user corresponds to the player; and
    in response to determining that the member corresponds to the player, means for transmitting an instruction to visually distinguish the player on the first device.

20. The system of claim 19, further comprising in response to determining that the member corresponds to the player, means for transmitting a second instruction to present additional information associated with the member.

21. The system of claim 20, further comprising means for overlaying the additional information on the player in the sports programming displayed on the first user device.

22. The system of claim 20, further comprising means for removing the additional information associated with the member in response to determining that the player is no longer currently appearing in the sports programming displayed on the first user device.

23. The system of claim 20, wherein additional information consists of audio commentary, box-scores, replays, statistics, and user-generated content.

24. The system of claim 20, wherein the additional information is presented on the second user device.

25. The system of claim 19, further comprising means for transmitting instructions to modify the additional information in response to a user input.

26. The system of claim 19, wherein means for processing the received data using an object recognition module to determine the name associated with the player further comprises:
    means for detecting, using the object recognition module, characteristics associated with the player; and
    means for comparing the characteristics associated with the player to a database listing characteristics corresponding to names associated with players.

27. The system of claim 26, wherein characteristics associated with the player comprise a jersey number.

* * * * *